Figure 1:
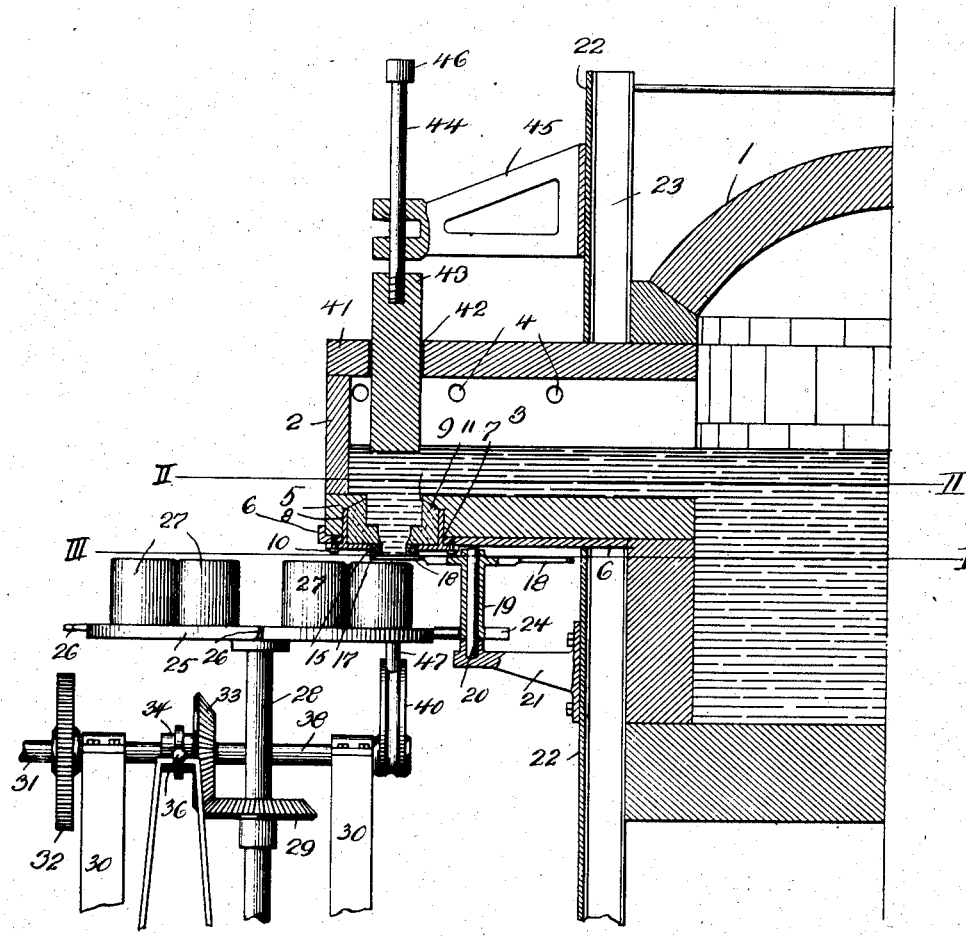

G. E. CLEVELAND.
GLASS FEEDING APPARATUS FOR TANKS, POTS, AND SIMILAR RECEPTACLES.
APPLICATION FILED NOV. 18, 1907.

901,881.

Patented Oct. 20, 1908.

3 SHEETS—SHEET 1.

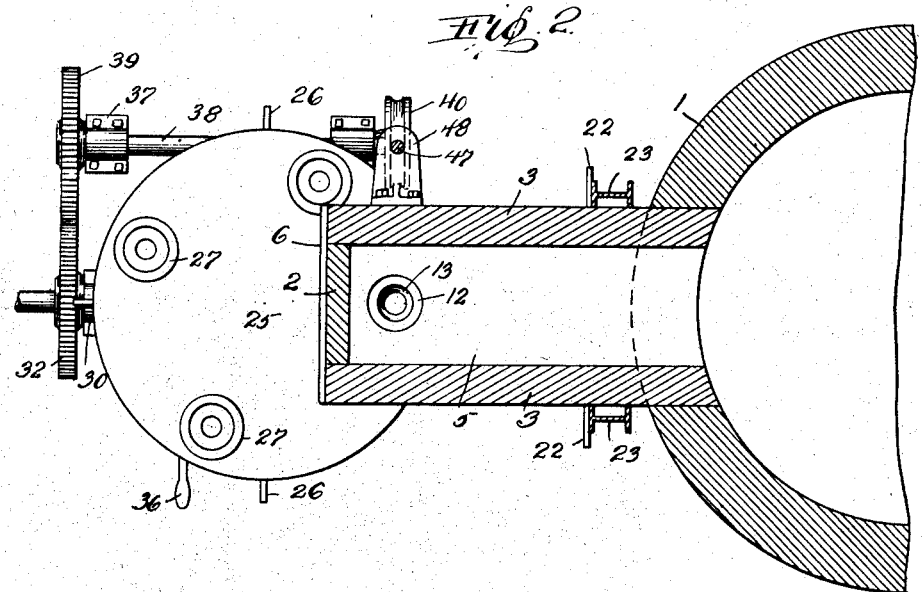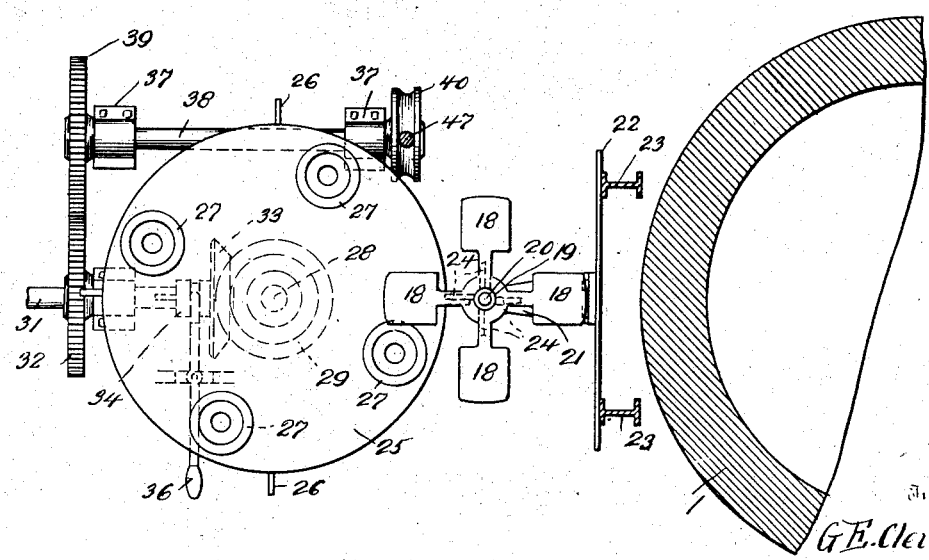

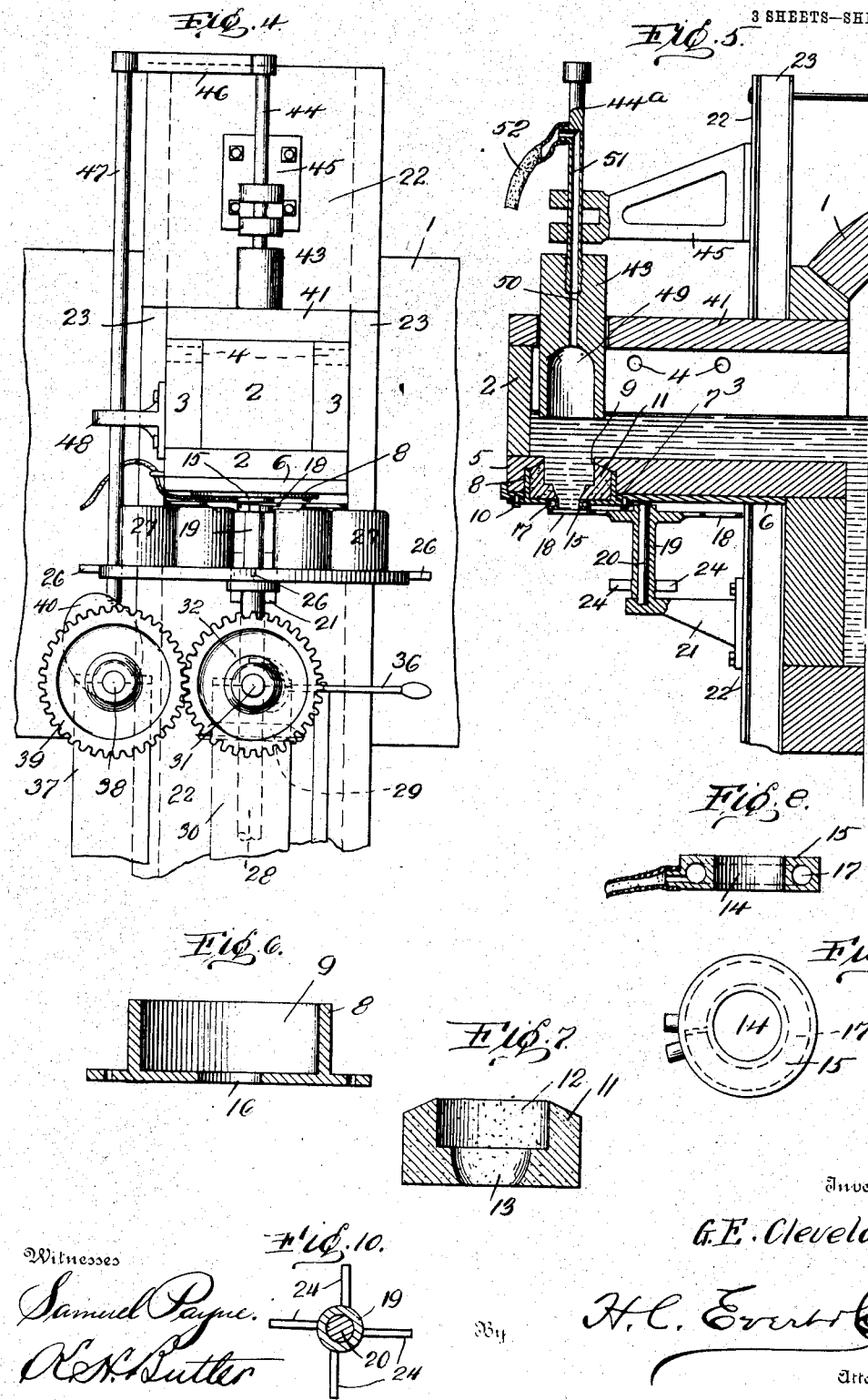

UNITED STATES PATENT OFFICE.

GEORGE E. CLEVELAND, OF GREENFIELD, INDIANA.

GLASS-FEEDING APPARATUS FOR TANKS, POTS, AND SIMILAR RECEPTACLES.

No. 901,881.     Specification of Letters Patent.     Patented Oct. 20, 1908.

Application filed November 18, 1907. Serial No. 402,713.

*To all whom it may concern:*

Be it known that I, GEORGE E. CLEVELAND, a citizen of the United States of America, residing at Greenfield, in the county of Hancock and State of Indiana, have invented certain new and useful Improvements in Glass-Feeding Apparatus for Tanks, Pots, and Similar Receptacles, of which the following is a specification, reference being had therein to the accompanying drawing.

This invention relates to a glass feeding apparatus for tanks, pots and similar receptacles, wherein raw material is melted and treated until it has reached the proper consistency, fluidity for molding or gathering purposes.

The primary object of this invention is to provide a novel feeding device for ejecting a predetermined quantity of molten glass into a suitable mold.

A further object of this invention is to provide an apparatus for automatically filling molds, wherein positive and reliable means are employed for feeding a quantity of molten material to a mold, cutting off the material and operating the movable parts of the apparatus for filling other molds.

To this end, I have devised a novel feeding apparatus that can be used in connection with tanks of various types, the feeding mechanism being extremely simple, durable, economical and positive in operation and adapted to save considerable labor in the production of glass ware, and vitreous articles.

My glass feeding apparatus will be presently described and reference will now be had to the drawings forming a part of this specification, wherein,—

Figure 1 is a vertical sectional view of the apparatus, partly in elevation, Fig. 2 is a horizontal sectional view of the apparatus taken on the line II—II of Fig. 1, Fig. 3 is a similar view taken on the line III—III of Fig. 1, Fig. 4 is a side elevation of the apparatus, Fig. 5 is a vertical sectional view of the apparatus in a slightly modified form of construction, Fig. 6 is an enlarged cross sectional view of a metallic shell used in connection with the apparatus, Fig. 7 is a similar view of a cup adapted to fit in the shell, Fig. 8 is an enlarged cross sectional view of a cooling metallic collar forming part of the apparatus, Fig. 9 is a plan of the same, and Fig. 10 is a sectional plan of the knife carrying sleeve.

In the accompanying drawings, I have conventionally illustrated a glass tank, wherein raw material is melted. The tank is provided with an extension 2 having a compartment 3 formed therein adapted to receive a quantity of the molten glass within the tank 1. The side walls of the extension 2 are provided with openings 4, whereby burners (not shown) can be inserted in the compartment 3 for maintaining a batch of molten material in a fluid state and of a consistency advantageous to the production of glass ware and articles.

The bottom 5 of the extension 2 is provided with a metallic plate 6, having an opening 7 formed therein for a metallic cylindrical shell 8 fitting in the bottom 5 of the extension, said bottom being cut away to accommodate said shell and provide an opening 9 through which the molten metal is adapted to pass. The shell 8 is flanged and secured to the plate 6 by screws 10. In this shell is supported a cup 11 made of clay or a similar non-fusible material. The cup has a concavity 12, corresponding in diameter to the opening 9 of the extension bottom 5, so also an opening 13 registering with an opening 14 formed in a metallic cooling collar 15 detachably mounted in an opening 16 provided therefor in the shell 5. The metallic cooling collar 15 is formed with a circular chamber 17, through which water passes to maintain the collar in a cool state and prevent its destruction which otherwise would be the case due to the action of the molten material passing through the opening 14 of said collar. The collar provides a shearing surface for knives 18 arranged beneath the plate 6, these knives serving two purposes, namely, to close the opening in the collar 14 and to shear the molten material after a certain quantity has passed into a mold. This is accomplished by radially disposing the knives upon a sleeve 19, said sleeve being revolubly mounted upon a standard 20, carried by a bracket 21, fixed to the plate 22, carried by the frame-work 23 of the tank 1. The sleeve 19 is provided with a star wheel 24 for intermittently moving the radially disposed knives 18.

Contiguous to the extension 2 of the tank 1 I arrange a revoluble mold support for carrying molds beneath the collar 15, whereby predetermined quantities of molten material can be deposited in the molds. The mold support comprises a table 25 having regularly disposed pins 26 corresponding in number to the molds 27 carried by the table or support, said molds having a certain relative position to said pins as will be presently described. The table 25 is fixed to a vertical shaft 28 carrying a beveled gear wheel 29.

Beneath the shaft 25 is a bearing 30 for a shaft 31 driven from a suitable source of power. This shaft carries a gear wheel 32 and a movable beveled gear wheel 33 adapted to mesh with the beveled gear wheel 29 of the vertical shaft 28. The beveled gear wheel 33 is moved into and out of engagement with the beveled gear wheel 29 through the medium of a suitable clutch mechanism 34, illustrated conventionally in Figs. 1 and 3 of the drawings, said mechanism being manipulated by a lever 36.

Arranged adjacent to the table are bearings 37 for a shaft 38, this shaft having a gear wheel 39 meshing with the gear wheel 32, and a grooved cam 40, the object of which will presently appear.

The extension 2 of the tank has its roof or top 41 provided with an opening 42 directly above the opening 9 formed in the bottom 5 of the extension. In the opening 42 is movably mounted a plunger 43 of a diameter corresponding to that of the opening 9. A plunger 43 is detachably carried by a rod 44 slidably mounted in a guide 45 fixed to the plate 22. The rod 44 is carried by a cross head 46 fixed upon the upper end of a pitman 47, said pitman being slidably mounted and guided in a bracket 48. The lower end of the pitman 47 rests upon the grooved cam 40 of the shaft 38 and is reciprocated thereby.

The operation of the apparatus as above described is as follows: The shafts 31 and 38 continuously revolve and when the beveled gear wheel 33 is moved into engagement with the beveled gear wheel 29, the table or mold support 25 is rotated. This movement of the table, however, is intermittent, for as soon as the mold is placed beneath the opening 14 of the collar 15, the operator moves the beveled gear wheel 33 out of engagement with the beveled gear wheel 29, allowing the table to remain stationary, without interfering with the revoluble shaft 38. By reference to Figs. 2 and 3 of the drawings, it will be observed that the pins 26 are located slightly in advance of the molds 27, whereby as the table 25 moves, the pin 26 will strike the star wheel 24 revolve sleeve 19 and move one of the knives 18 from beneath the collar 15. By the time this movement has been accomplished the mold is in position beneath the collar to receive the molten material from the compartment 3 of the extension 2. The cam 40 of the shaft 38 now allows the pitman 47, rod 44, and plunger 43 to descend by gravity. As the plunger 43 enters the opening 9 of the extension 2, a quantity of molten material within the cup 11 is severed from the remainder of the material in the extension. The material contained within the cup is forced through the opening 13 thereof and the opening 14 of the collar into the mold. Immediately upon the material being ejected into the mold, the plunger 43 recedes. The following operator now places the gear wheel 33 in engagement with the beveled gear wheel 29, and the table 25 is again moved. Since the pin 26 which first moved the star wheel 29, has not passed out of engagement with said star wheel, said wheel will be further moved to cause one of the knives to pass under the collar 15, severing the material and closing the opening 14. This movement of the knives is accomplished before the plunger 43 entirely recedes from the cup 11, thereby preventing an inrush of molten material that might pass through the collar were not a knife in position to close the same. The molds placed upon the table 25 are successively filled, each mold being removed from the table after receiving the quantity of molten material and an empty mold placed in position.

Reference will now be had to a slight modification of my invention, illustrated in Fig. 5 of the drawings. In this modification I employ air or steam under pressure for forcing a quantity of the molten material into and through the cup 11. The plunger 43 is provided with a concavity 49 and with a passageway 50 communicating with the bore 51 of a rod 44$^a$, this rod being similar to the rod 44 with the exception of the bore 51. Connected to the rod 44$^a$ is an air or steam supply pipe or holes 52 for admitting air or steam under pressure through the top 51, passageway 50 and concavity 49. The cavity end of the plunger 43 is always retained in the molten material contained within the extension 2, and its diameter is such as to rest upon the bottom of the extension, without entering the cup 11. Immediately upon the plunger 43 being lowered to sever a quantity of molten material from that contained within the extension, the pressure of air or steam is turned on, and this air or steam forces molten material from the cup 11 through the collar into the mold beneath the same. I attach considerable importance to the plunger irrespective of the mechanism employed for reciprocating the same. This plunger can be used in the tank proper for forcing a quantity of the contents thereof through an opening provided therefor in the bottom of the tank. The cam 40 determines the stroke of the plunger 43, consequently the quantity of molten material forced into a mold can be governed by the stroke of the plunger, or by the size of the cup 11. For instance, in the manufacture of plate glass, the cup can be made sufficiently large for a batch of molten material, the quantity being sufficient for the production of a large plate of glass. By providing a detachable shell, cup and collar, these parts of the apparatus can be readily renewed.

It is thought that my invention will be fully understood from the foregoing description, and I reserve a right to make such alterations in my invention as are permissible by the appended claims.

Having now described my invention what I claim as new, is:—

1. The combination with a tank having an extension, of a cup detachably mounted in the bottom of said extension, a reciprocating plunger movably mounted in said extension and adapted to enter said cup, a cooling collar supported beneath said cup, revoluble knives arranged beneath said extension for closing said collar, a movable mold support arranged adjacent to said extension for supporting a mold beneath said collar, means for intermittently moving said mold support, means actuated by said mold support for moving said knives, and means for reciprocating said plunger.

2. The combination with a tank having an extension, of a cup mounted in the bottom of said extension, a cooling collar arranged beneath said cup, revoluble knives arranged beneath said collar, a plunger mounted in said extension and adapted to enter said cup, a movable mold support arranged adjacent to said extension for supporting a mold beneath said collar, means for rotating said mold support, means carried by the mold support for shifting said knives, and means for moving said plunger.

3. The combination with a tank having an extension, of a cup mounted in said extension, revoluble knives arranged beneath said cup, a movable mold support for supporting a mold beneath said cup, a plunger mounted in said extension and adapted to enter said cup, means for moving said mold support, means actuated by said mold support for moving said knives, and means for reciprocating said plunger.

4. A glass feeding apparatus comprising a cup for holding a quantity of glass, a reciprocating plunger for entering said cup, and forcing the glass therefrom, a mold support for supporting a mold beneath said cup to receive the contents thereof, and an intermittently shiftable means rotatably supported adjacent to said mold support for closing the cup and severing the material passing therefrom.

5. A glass feeding apparatus comprising the combination with a tank formed with an extension having an outlet, a cup arranged in operative relation with respect to said outlet and adapted to hold a quantity of glass, a reciprocating plunger extending through the top of the extension and adapted to enter the cup thereby forcing the glass therethrough, an intermittently rotatable member arranged in suitable relation with respect to said cup, a plurality of molds carried by said member and adapted to be successively positioned below said cup to receive the contents therefrom, a vertically-extending loosely-mounted sleeve arranged adjacent to said cup and member, a series of radially-extending knives carried by the sleeve for closing the cup and severing the material passing therefrom, and means carried by said member for shifting said knives.

In testimony whereof I affix my signature in the presence of two witnesses.

GEORGE E. CLEVELAND.

Witnesses:
MAX H. SROLOVITZ,
A. J. TRIGG.